(12) United States Patent
Ready

(10) Patent No.: US 11,196,496 B2
(45) Date of Patent: *Dec. 7, 2021

(54) FREQUENCY SELECTIVE SYSTEM

(71) Applicant: RAYTHEON APPLIED SIGNAL TECHNOLOGY, INC., Sunnyvale, CA (US)

(72) Inventor: Michael Ready, Santa Cruz, CA (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/744,066

(22) Filed: Jan. 15, 2020

(65) Prior Publication Data

US 2020/0153523 A1     May 14, 2020

Related U.S. Application Data

(63) Continuation of application No. 15/880,242, filed on Jan. 25, 2018, now Pat. No. 10,574,374.

(51) Int. Cl.
    *H04J 1/04*     (2006.01)
    *H04L 27/26*     (2006.01)
    *H04L 25/03*     (2006.01)
    *H04L 1/04*     (2006.01)
    *H04B 7/12*     (2006.01)

(52) U.S. Cl.
CPC ........ *H04J 1/045* (2013.01); *H04L 25/03821* (2013.01); *H04L 27/2637* (2013.01); *H04B 7/12* (2013.01); *H04L 1/04* (2013.01)

(58) Field of Classification Search
CPC ........ H04J 1/045; H04L 1/04; H04L 27/2637; H04B 7/12
See application file for complete search history.

(56) References Cited

U.S. PATENT DOCUMENTS

| | | | |
|---|---|---|---|
| 4,991,923 A | 2/1991 | Kino et al. | |
| 9,647,861 B1 | 5/2017 | Loren et al. | |
| 2014/0029948 A1* | 1/2014 | Wellbrock | H04J 14/0213 398/83 |

(Continued)

OTHER PUBLICATIONS

Website: "Mach-Zehnder interferometer", Wikipedia, https://en.wikipedia.org/wiki/Mach-Zehnder_interferometer, printed Jan. 23, 2018, 5 pages.

*Primary Examiner* — Jamal Javaid
*Assistant Examiner* — Ryan C Kavleski
(74) *Attorney, Agent, or Firm* — Lewis Roca Rothgerber Christie LLP

(57) ABSTRACT

A frequency-selective system that may be used as, or as part of, an add/drop multiplexer. An input signal is fed to a Mach-Zehnder interferometer configured to drop, or suppress, by destructive interference, a signal component in a first frequency band from among a plurality of frequency bands. One or more bandpass filters in one arm of the Mach-Zehnder interferometer suppress other frequencies, outside of the first frequency band, so that signals at these other frequencies are not suppressed by destructive interference and are present at the output of the Mach-Zehnder interferometer. A coupler connected after the output of the Mach-Zehnder interferometer adds, into the signal path, a replacement for the dropped signal.

18 Claims, 5 Drawing Sheets

(56) References Cited

U.S. PATENT DOCUMENTS

2016/0013820 A1\* 1/2016 Yamanouchi ........ H04B 1/0475
  375/297
2016/0373125 A1\* 12/2016 Pagnanelli ............ H03M 3/468
2017/0077945 A1 3/2017 Pagnanelli
2017/0163308 A1\* 6/2017 Fattinger ............... H04L 5/1461

\* cited by examiner

FREQUENCY SELECTIVE SYSTEM

CROSS-REFERENCE TO RELATED APPLICATION(S)

The present application is a continuation of U.S. patent application Ser. No. 15/880,242, filed Jan. 25, 2018, entitled "FREQUENCY SELECTIVE SYSTEM", issued Feb. 27, 2020 as U.S. Pat. No. 10,574,374, the entire content of which is incorporated herein by reference.

FIELD

One or more aspects of embodiments according to the present invention relate to multichannel communications, and more particularly to an add/drop mulitplexer for such a system.

BACKGROUND

A communication system may use a plurality of frequency bands to transmit data over a corresponding plurality of channels, in a technique that may be referred to as frequency division multiplexing. For example, each frequency band may include a carrier frequency and the carriers may be separately modulated with data.

In such a system it may be desirable to drop the signal from one of the frequency bands, e.g., if it has reached its intended destination, and to add another signal in its place in the spectrum.

Thus, there is a need for a system for removing a signal in one of a plurality of frequency bands, and substituting another signal in the same frequency band.

SUMMARY

Aspects of embodiments of the present disclosure are directed toward an add/drop multiplexer. An input signal is fed to a Mach-Zehnder interferometer configured to drop, or suppress, by destructive interference, a signal component in a first frequency band from among a plurality of frequency bands. One or more bandpass filters in one arm of the Mach-Zehnder interferometer suppress other frequencies, outside of the first frequency band, so that signals at these other frequencies are not suppressed by destructive interference and are present at the output of the Mach-Zehnder interferometer. A summer or coupler or radio transmitter connected after the output of the Mach-Zehnder interferometer adds, into the signal path, a replacement for the dropped signal.

According to an embodiment of the present invention there is provided a frequency selective system having a first input for receiving an input signal including a plurality of frequency bands and a first output, the frequency selective system including: a first coupler for splitting the input signal to a first path and a second path each having an input and an output, the first path including a first bandpass filter having a pass band extending over a first frequency band of the plurality of frequency bands; and a second coupler, having a first input connected to the output of the first path and a second input connected to the output of the second path, for combining the output of the first path and the output of the second path, the first coupler, the first path, the second path, and the second coupler being configured to produce destructive interference, at the output of the second coupler, of signal components, in the input signal, within the first frequency band.

In one embodiment, the frequency selective system includes: a second input for receiving an add signal within the first frequency band of the plurality of frequency bands; and a third coupler having a first input connected to an output of the second coupler and a second input connected to the second input of the frequency selective system.

In one embodiment, the frequency selective system includes an amplifier between the second input of the frequency selective system and the second input of the third coupler.

In one embodiment, the frequency selective system includes a fourth coupler in the second path, after the first bandpass filter, for outputting a drop signal, the drop signal including components, in the input signal, within the first frequency band.

In one embodiment, the first path further includes a variable delay element.

In one embodiment, the variable delay element has an electronically controllable delay; and the frequency selective system further includes a feedback control system configured to estimate a delay error and to feed back to the electronically controllable delay to reduce the delay error, the delay error being the difference between a present delay in the first path, and a delay at which: a contribution at a first frequency in the first frequency band, from the first path, to a signal at the output of the second coupler, has a phase differing by 180 degrees from the phase of a contribution at the first frequency, from the second path, to the signal at the output of the second coupler.

In one embodiment, the feedback control system includes a processing circuit configured to receive a signal from a sensor configured to sense a quantity influenced by the delay error.

In one embodiment, the frequency selective system includes: a fifth coupler having an input, a first output and a second output; a bandpass filter; and a power meter, wherein: the sensor is a power meter having an input and an output connected to the processing circuit; the input of the fifth coupler is connected to the output of the second coupler; and the second output of the fifth coupler is connected through the bandpass filter to the power meter.

In one embodiment, the processing circuit is configured: to dither the electronically controllable delay, to detect synchronous changes in a signal at the output of the power meter, and to estimate, from the synchronous changes in the signal at the output of the power meter, a magnitude and direction of the delay error.

In one embodiment, the sensor is a digital to analog converter, and the processing circuit is configured to employ a least mean squares algorithm to adjust the electronically controllable delay.

In one embodiment, the frequency selective system includes a polarization transducer in the first path.

In one embodiment, the polarization transducer is an electronically controllable polarization transducer; and the feedback control system is further configured to estimate a polarization error and to feed back to the electronically controllable polarization transducer to reduce the polarization error, the polarization error being the difference between a present polarization in the first path, and a polarization for which: a contribution, at a first frequency in the first frequency band, from the first path, to a signal at the output of the second coupler, has the same polarization as a contribution at the first frequency, from the second path, to the signal at the output of the second coupler.

In one embodiment, the frequency selective system includes: a fifth coupler having an input, a first output and a second output; a bandpass filter; and a power meter, wherein: the input of the fifth coupler is connected to the output of the second coupler; and the second output of the fifth coupler is connected through the bandpass filter to the power meter, wherein the feedback control system includes a processing circuit configured to: dither two or more control parameters of the electronically controllable polarization transducer, detect synchronous changes in a signal at the output of the power meter, and estimate, from the synchronous changes in the signal at the output of the power meter, a magnitude and direction of the polarization error.

In one embodiment, the processing circuit is configured to dither the two or more control parameters at different respective frequencies.

In one embodiment, the frequency selective system includes a variable gain amplifier in the first path.

In one embodiment, the variable gain amplifier is an amplifier having an electronically controllable gain; and the feedback control system is further configured to estimate a gain error and to feed back to the electronically controllable gain to reduce the gain error, the gain error being the difference between a present gain in the first path, and a gain for which: a contribution, at a first frequency in the first frequency band, from the first path, to a signal at the output of the second coupler, has the same amplitude as a contribution at the first frequency, from the second path, to the signal at the output of the second coupler.

In one embodiment, the frequency selective system includes: a fifth coupler having an input, a first output and a second output; a bandpass filter; and a power meter, wherein: the input of the fifth coupler is connected to the output of the second coupler; and the second output of the fifth coupler is connected through the bandpass filter to the power meter, wherein the feedback control system includes a processing circuit configured to: dither the electronically controllable gain, detect synchronous changes in a signal at the output of the power meter, and estimate, from the synchronous changes in the signal at the output of the power meter, a magnitude and direction of the gain error.

In one embodiment, the first path further includes a variable delay element; the variable delay element has an electronically controllable delay; and the frequency selective system further includes a control system configured to estimate a delay error and to feed back to the electronically controllable delay to reduce the delay error, the delay error being the difference between a present delay in the first path, and a delay at which: a contribution at a first frequency in the first frequency band, from the first path, to a signal at the output of the second coupler, has a phase differing by 180 degrees from the phase of a contribution at the first frequency, from the second path, to the signal at the output of the second coupler, the control system being configured to estimate the delay error utilizing a least mean squares algorithm.

In one embodiment, the frequency selective system includes a fixed delay element in the second path.

In one embodiment, the frequency selective system includes: an amplifier connected to an output of the first bandpass filter, and a second bandpass filter, having a pass band extending over the first frequency band, connected to an output of the amplifier.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of an add/drop multiplexer provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
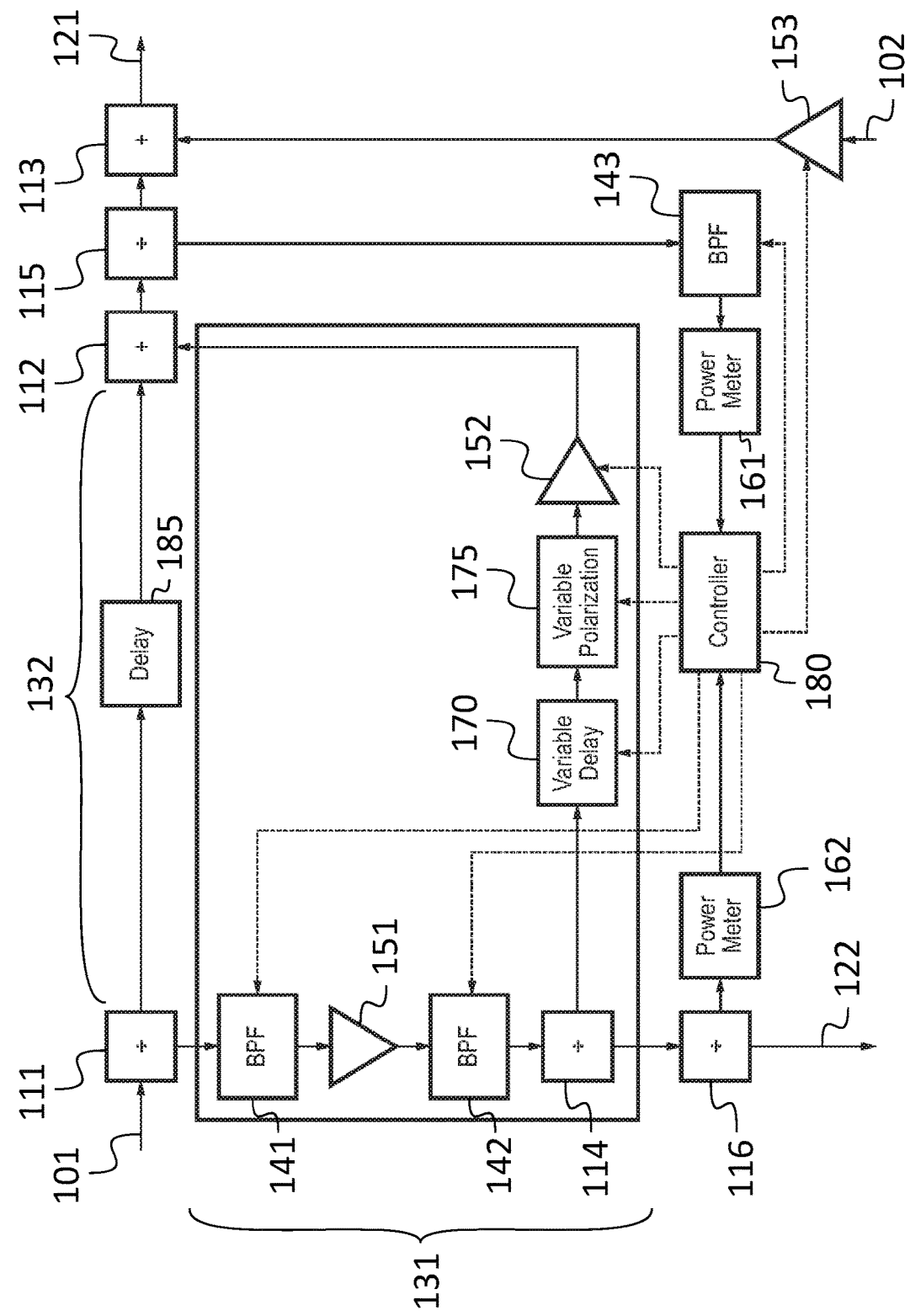
FIG. 1 is a block diagram of an add/drop multiplexer, according to an embodiment of the present invention.

Referring to FIG. 1, in some embodiments an add/drop multiplexer has a first input 101, a first output 121, a second output (the "drop" output) 122, and a second input (the "add" input) 102. In operation, a composite (frequency division multiplexed) signal at the first input 101 includes a plurality of frequency bands, the plurality of frequency bands including a first frequency band. The signal within the first frequency band is extracted from the frequency division multiplexed signal so that it is not transmitted to the first output 121, and a signal at the second input 102, if present, is substituted, into the vacated frequency band, in the signal at the first output 121. In FIG. 1, solid lines with arrows are signal paths, and dashed lines are control paths. The add/drop multiplexer is an example of a frequency selective system. As used herein, a "frequency selective system" is a system that has at least one input, and the behavior of which, in operation, when a signal is present at the input, is affected by the frequency content of the signal at the input.

In the embodiment of FIG. 1, the function of dropping the component in the first frequency band is performed by a Mach-Zehnder interferometer including a first coupler 111 that operates as a splitter, splitting the received signal power so that a portion of the received signal travels along a first path 131 and so that another portion of the received signal travels along a second path 132. The Mach-Zehnder interferometer also includes a second coupler 112 that operates as a combiner, combining the portions of the received signal after they have traveled along the first path 131 and the second path 132. When the respective delays in the first path 131 and in the second path 132 are such that, for frequencies within the first frequency band, the contributions, at the second coupler 112, from the first path 131 and from the second path 132, cancel destructively, the contribution in the first frequency band, in the signal at the first output 121, from the received signal at the first input 101, may be suppressed or substantially eliminated. A replacement signal (the "add" signal) in the first frequency band may then be coupled into the signal at the output of the second coupler 112 via a third coupler 113.

In some embodiments, filtering is employed within the first path 131, to suppress frequencies that are not in the first frequency band, so that such frequencies are not suppressed by destructive interference at the second coupler 112. For example, a first bandpass filter (BPF) 141 and a second bandpass filter 142 may be used to pass frequencies in the first frequency band and suppress frequencies not in the first frequency band. In some embodiments, more or fewer than two bandpass filters may be employed in the first path 131, to similar effect. In the embodiment of FIG. 1, a first amplifier 151 is connected in cascade between the first bandpass filter 141 and the second bandpass filter 142 to avoid a reduction in signal strength that otherwise may result in unacceptable signal-to-noise ratio degradation, e.g., at a subsequent active element (e.g., at a second amplifier 152) that may add noise to the signal it processes. The amplifier 151 may introduce broadband noise that might, absent the second bandpass filter 142, be added into the other signal bands causing interference for the other signals in the band. The second bandpass filter 142 suppresses noise outside the first band.

The output of the bandpass filter or filters 141 and 142 may be fed to the input of a fourth coupler 114 which may be configured to operate as a splitter, coupling a portion of the signal in the first path 131, out of the first path 131, to the second output 122 (the "drop" output) of the add/drop multiplexer. At the drop output 122 a sixth coupler 116 may split off a further portion of this signal for use in controlling signal levels, as described in further detail below.

In some embodiments, the add/drop multiplexer further includes a variable delay element 170, a polarization transducer 175, and the second amplifier 152, for adjusting the delay in the first path 131, and the polarization state and amplitude of the signal at the output of the first path 131 (i.e., at the second coupler 112). The variable delay element 170, the polarization transducer 175, the second amplifier 152 and the bandpass filters 141, 142, 143, may be manually adjustable (e.g., during manufacturing), if the add/drop multiplexer is to be used for a certain, fixed frequency band, or they may be electronically controllable, if the add/drop multiplexer is to be tunable, or to make it possible to adjust the delay, polarization, and gain to compensate for changes in other elements in the first path 131, during operation, e.g., as a result of changes in ambient temperature.

A controller 180, which may be a processing circuit, as discussed in further detail below, may control the variable delay element 170, the polarization transducer 175, the second amplifier 152, and the bandpass filters 141, 142, 143, in real time, to maintain destructive interference, at the second coupler 112, for signals in the first frequency band. To control the delay in the first path 131, the controller 180 may estimate a delay error and feed back to the electronically controllable delay 170 to reduce the delay error, the delay error being the difference between a present delay in the first path, and a delay at which the delay is correct for destructive interference, i.e., at which a contribution at a first frequency in the first frequency band, from the first path, at the output of the second coupler has a phase differing by 180 degrees from the phase of a contribution at the first frequency, from the second path, at the output of the second coupler resulting in destructive cancellation of the first frequency band signal at the first output 121.

The controller 180 may estimate the delay error using a signal from a sensor configured to sense a quantity influenced by the delay error. For example, in the embodiment of FIG. 1, a fifth coupler 115 is connected between the second coupler 112 and the third coupler 113 at the first output 121 of the add/drop multiplexer. The fifth coupler 115 is configured to act as a splitter that diverts a portion of the signal through a third bandpass filter 143 (which is also controllable by the controller 180, and which is also configured to pass signals in the first frequency band and to suppress signals not in the first frequency band, and which may also be controllable by the controller 180) to a first power meter 161, the output of which is connected to the controller 180. When the interference at the second coupler 112, for signals in the first frequency band, deviates from destructive interference, the power measured by the first power meter 161 increases, providing an indication to the controller 180 that the add/drop multiplexer has deviated from a condition of destructive interference.

The controller 180 may apply a time-varying delay offset to the variable delay element 170, i.e., it may cause the delay of the variable delay element 170 alternately to increase and decrease, and simultaneously measure the power received by the first power meter 161, to generate an estimate of the delay error. The alternate increases and decreases in delay may be referred to as "dithering" and may be sufficiently small to avoid significantly degrading the destructive interference for signals in the first frequency band, while also being sufficiently large to produce a measurable change in the power measured by the first power meter 161. As used herein, when dithering is employed, the "error" (e.g., the "delay error") refers to the error (e.g., the delay error) excluding any contribution from the time varying offset applied by dithering, and the "total error" (e.g., the "total delay error") refers to the error including the offset applied by dithering. This terminology may be used not only for the delay error, but also for polarization and gain errors (discussed in further detail below). The magnitude and direction of an asymmetry (as a function of the delay offset) in the increase in power measured by the first power meter 161 (i.e., in the increase resulting in a deviation from destructive interference) may then be used to infer the magnitude and direction of the delay error. For example if the delay error is positive, then decreasing the delay may initially result in a reduction in the power measured by the first power meter 161, followed by a small increase as the delay offset is further reduced and the total delay error becomes negative, whereas increasing the delay may result in a monotonic (approximately quadratic) increase in the power measured by the first power meter 161. Accordingly, in some embodiments the controller alternately (i) increases the delay and measures power, and (ii) decreases the delay and measures power, and then takes a small step in the direction that decreased the power. The process of introducing a time-varying offset into a quantity being controlled, and monitoring the system's synchronous response, may be referred to herein as "dithering detection".

The controller 180 may similarly estimate a polarization error, which may be a vector quantity having two or more (e.g., four or eight) elements corresponding to a suitably parameterized polarization transformation. For perfect destructive interference, two signals being added may have the same amplitude, opposite phases (i.e., respective phases differing by 180 degrees), and the same polarization (e.g., both signals being horizontally polarized or vertically polarized, or both signals being in the same circular or elliptical polarization state). Accordingly, in a manner analogous to that of the delay error, the polarization error may be defined to be the (vector) difference between a present polarization in the first path 131 and a polarization for which a contribution in the first frequency band, from the first path 131, at the output of the second coupler 112, has the same polarization as a contribution at the first frequency, from the second path 132, to the signal at the output of the second coupler 112. The controller 180 may estimate the polarization error using a signal from a sensor configured to sense a quantity influenced by the polarization error, such as (as in the case of the delay error), the first power meter 161. When the interference at the second coupler 112, for signals in the first frequency band, deviates from destructive interference, the power measured by the first power meter 161 may increase, providing an indication to the controller 180 that the polarization error has caused a deviation from a condition of destructive interference. Because this deviation may be caused by a polarization error, the signal from the first power meter 161 is influenced by the polarization error.

In a manner analogous to the controller's active control of the variable delay element 170 to actively reduce the delay error, the controller 180 may actively control the polarization transducer 175 to actively reduce the polarization error. The controller 180 may dither two or more control inputs of the polarization transducer 175 and estimate the polarization error in a manner analogous to that described above for the estimation of the delay error. In operation, the controller 180 may feed back to the polarization transducer 175, to actively reduce the polarization error.

The second amplifier 152 may be a variable gain amplifier with a gain adjusted so that at the output of the second coupler 112, in the first frequency band, the amplitude of the signal contribution from the first path 131 is the same as the amplitude of the signal contribution from the second path 132. The controller 180 may also estimate a gain error, which may be defined to be the difference between a present gain in the first path 131 and a gain at which, at the output of the second coupler 112, a contribution at a first frequency in the first frequency band, from the first path 131, has the same amplitude as a contribution, at the first frequency, from the first path 131. The controller 180 may estimate the gain error using a signal from a sensor configured to sense a quantity influenced by the gain error, such as the first power meter 161. When the interference at the second coupler 112, for signals in the first frequency band deviates from destructive interference, the power measured by the first power meter 161 may increase, providing an indication to the controller 180 that the add/drop multiplexer has deviated from a condition of destructive interference. Because this deviation may be caused by a gain error, the signal from the first power meter 161 is influenced by the polarization error.

In a manner analogous to the controller's active control of the variable delay element 170 to actively reduce the delay error, the controller 180 may actively control the gain of the second amplifier 152 to actively reduce the gain error. The controller 180 may dither a control input of the second amplifier 152 and estimate the gain error in a manner analogous to that described above for the estimation of the delay error. In operation, the controller 180 may filter the estimated gain error with a suitable loop-shaping filter (e.g., a digital infinite impulse response (IIR) filter) and feed back to the second amplifier 152 with the output of the filter, to actively reduce the gain error.

Dithering to estimate the four or more errors identified above (i.e., the delay error, two or more polarization errors, and the gain error) may be performed in a manner such that each dithering signal differs from each other dithering signal either in frequency or in phase, with at most two dithering signals being at any dithering frequency (and separated in phase). Where different frequencies are used, the frequencies of each pair of frequencies may differ by more than (e.g., by a factor of 10 times) the greater one of the two respective unity gain frequencies of the two corresponding control loops. In other embodiments the parameters are dithered one at a time (with the others held fixed), to estimate corresponding errors.

In some embodiments, the controller 180 may implement a least mean squares algorithm (instead of employing dithering detection) to estimate the delay error, the gain error, and the polarization error. In such an embodiment, the first power meter 161 and a second power meter 162 may be absent and the controller 180 may detect (e.g., by direct sampling and analog to digital conversion or by mixing down to an intermediate frequency and sampling and analog to digital conversion of the intermediate frequency signal) the amplitude and phase of the two signals that would be received by the first power meter 161 and the second power meter 162 if these power meters were present. Such an embodiment may employ analog to digital converters and a processor fast enough to operate on the data. Accordingly, such an embodiment may be more readily implemented at lower frequencies (e.g., at frequencies lower than microwave frequencies) than at higher frequencies (e.g., at optical frequencies).

The second path 132 may include a fixed delay 185 providing an amount of delay that ensures that in all circumstances (e.g., for all combinations of controlled parameters (e.g., the range of frequencies in the first frequency band, the settings of the first bandpass filter 141 and the second bandpass filter 142, the setting of the polarization transducer 175, and the gain setting of the second amplifier 152), and for all values of other parameters, e.g., the ambient temperature), the variable delay element 170 has sufficient range to make the delay in the first path 131 equal the delay in the second path 132. In some embodiments a delay element is included in the second path 132 instead of, or in addition to, the fixed delay 185 in the first path. In some embodiments, (e.g., in which the signals propagating in the first path 131 and the second path 132 are electrical signals) one of the first path 131 and the second path 132 includes an inverting amplifier (e.g., an additional amplifier, or one of the amplifiers 151, 152 shown). Such an inverting amplifier may introduce a phase change of 180 degrees over a broad frequency range.

The add/drop multiplexer may include a third amplifier 153 connected in cascade with the second input 102 and configured to amplify the "add" signal. The third amplifier 153 may, like the second amplifier 152, have a variable, (e.g., an electronically controllable) gain. The controller 180 may infer, from the power measured by the second power meter 162, the power in the first frequency band at the first input 101 of the add/drop multiplexer, and adjust the gain of the third amplifier 153 so that the power, in the first frequency band, at the first output 121 of the add/drop multiplexer is the same or substantially the same as it would have been had it not been suppressed by destructive interference at the second coupler 112. If the power in each of the plurality of frequency bands (that include the first frequency band) is substantially the same at the first input 101 of the add/drop multiplexer, adjusting the gain of the third amplifier 153 in the manner described above may have the effect that the power in each of the plurality of frequency bands is also substantially the same at the first output 121 of the add/drop multiplexer (although the power, in each frequency band, at the first output 121 of the add/drop multiplexer may differ from the power, in the same frequency band, at the first input 101 of the add/drop multiplexer).

In the embodiment of FIG. 1, if the controller 180 is a digital circuit (e.g., a processing circuit) then its interfaces with the other elements of FIG. 1 to which it is connected may be digital. To the extent these other elements employ analog signals, they may include analog to digital converters and/or digital to analog converters. In other embodiments, one or more of the interfaces with the other elements of FIG. 1 to which the controller 180 is connected may be analog, and the controller 180 may include both a processing circuit (as described in further detail below) and suitable analog to digital converters and/or digital to analog converters, suitably connected to convert between the digital interfaces of the processing circuit and the analog interfaces of these other elements.

Although in the embodiment of FIG. 1 various adjustable elements are in the first path 131, the invention is not limited to such an embodiment and it will be understood that some or all of them may instead be in the second path 132.

In some embodiments, the one of the plurality of frequency bands that is dropped and added by the add/drop multiplexer may be selectable. For example, each of the bandpass filters 141, 142, 143 may be tunable (e.g., electronically tunable, under the control of the controller 180). After such a change in the frequency band, the controller 180 may automatically adjust the phase, polarization, and amplitude of the signal at the output of the first path 131, using dithering detection and real time feedback, as described above.

Figure 2A:
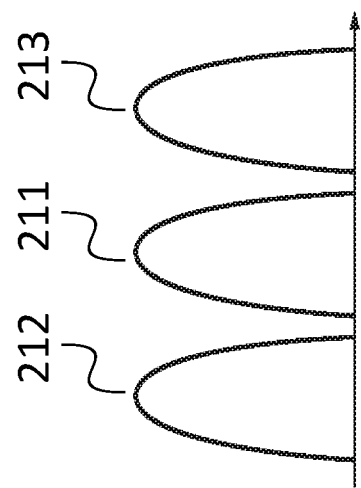
FIG. 2A is a graph of a spectrum of a signal in an add/drop multiplexer, according to an embodiment of the present invention.
Figure 2B:
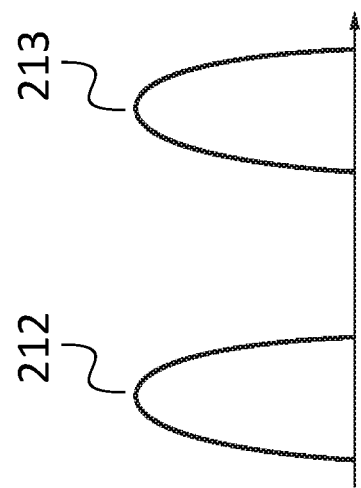
FIG. 2B is a graph of a spectrum of a signal in an add/drop multiplexer, according to an embodiment of the present invention.
Figure 2C:
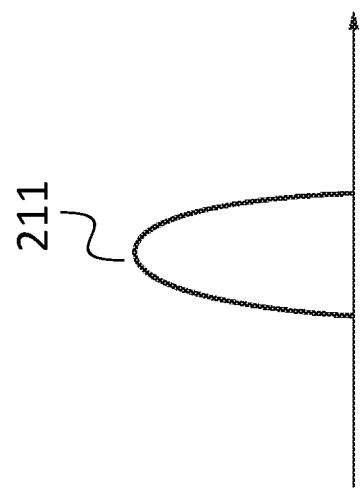
FIG. 2C is a graph of a spectrum of a signal in an add/drop multiplexer, according to an embodiment of the present invention.
Figure 2D:
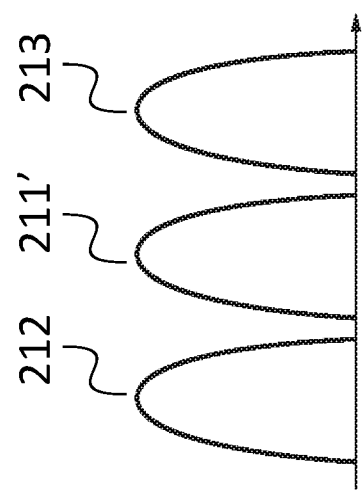
FIG. 2D is a graph of a spectrum of a signal in an add/drop multiplexer, according to an embodiment of the present invention.

FIGS. 2A-2D show spectra at different points of the system, in operation, in one embodiment. FIG. 2A shows a spectrum of a signal that may be present at the first input 101, including first, second, and third signal components 211, 212, and 213 in three different respective frequency bands, the first signal component 211 being in the first frequency band, between the frequency bands corresponding to the second and third signal components 212, 213. FIG. 2B shows the spectrum of the signal at the output of the second coupler 112 with the first signal component 211 being substantially absent as a result of destructive interference in the second coupler 112. FIG. 2C shows the spectrum of the signal at the second output 122. At this output, the second and third signal components 212, 213 are suppressed by the first bandpass filter 141 and the second bandpass filter 142. FIG. 2D shows the spectrum of the signal at the first output 121. At this output, a new signal 211' is present, as a result of having been added through the third coupler 113.

As can be seen from the spectra in FIGS. 2A-2D, the add/drop multiplexer of FIG. 1 may be employed in a frequency division multiplexed communication system using a plurality of frequency bands to transmit data over a corresponding plurality of channels. In such a communication system, the add/drop multiplexer may drop the signal from one of the frequency bands as a result of destructive interference in the Mach-Zehnder interferometer, and add another signal in its place in the spectrum, through the third coupler 113.

Embodiments of the present invention may be used with electromagnetic waves of arbitrary frequency, including radio frequency electromagnetic waves and optical electromagnetic waves. Terms such as "frequency", "frequency band", "frequency division multiplexing", and the like, are used to refer to an electromagnetic communication system no matter what the frequency or wavelength range used, and these terms are used to include optical communications systems although in such systems it may be more customary to refer to wavelength than to frequency.

It will be understood that when an element is referred to as being "connected to", or "coupled to", another element, it may be directly connected to, or coupled to, the other element, or one or more intervening elements may be present. In contrast, when an element is referred to as being "directly connected to", or "directly coupled to", another element or layer, there are no intervening elements present.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB.

Although limited embodiments of an add/drop multiplexer have been specifically described and illustrated herein, many modifications and variations will be apparent to those skilled in the art. Accordingly, it is to be understood that an add/drop multiplexer employed according to principles of this invention may be embodied other than as specifically described herein. The invention is also defined in the following claims, and equivalents thereof.

What is claimed is:

1. A frequency selective system having a first input for receiving an input signal including a plurality of frequency bands and a first output, the frequency selective system comprising:
   a first coupler for splitting the input signal to a first path and a second path each having an input and an output; and
   a second coupler, having a first input connected to the output of the first path and a second input connected to the output of the second path, for combining the output of the first path and the output of the second path, wherein
   the first coupler, the first path, the second path, and the second coupler being configured to produce at least partial cancellation, at the output of the second coupler, of signal components, in the input signal, within a first frequency band of the plurality of frequency bands, and wherein the first path further comprises an electronically controllable delay and a feedback control system configured to estimate a delay error and to feed back to the electronically controllable delay to reduce the delay error, the delay error being the difference between a present delay in the first path, and a delay at which:
   a contribution at a first frequency in the first frequency band, from the first path, to a signal at the output of the second coupler, has a phase differing by 180 degrees from the phase of a contribution at the first frequency, from the second path, to the signal at the output of the second coupler.

2. The frequency selective system of claim 1, further comprising a first bandpass filter having a pass band extending over the first frequency band.

3. The frequency selective system of claim 1, further comprising:
a second input for receiving an add signal within the first frequency band of the plurality of frequency bands; and
a third coupler having a first input connected to an output of the second coupler and a second input connected to the second input of the frequency selective system.

4. The frequency selective system of claim 3, further comprising an amplifier between the second input of the frequency selective system and the second input of the third coupler.

5. The frequency selective system of claim 1, wherein:
the first path comprises a first bandpass filter having a pass band extending over the first frequency band; and
the frequency selective system further comprises a fourth coupler in the first path, after the first bandpass filter, for outputting a drop signal, the drop signal comprising components, in the input signal, within the first frequency band.

6. The frequency selective system of claim 1, wherein the feedback control system comprises a processing circuit configured to receive a signal from a sensor configured to sense a quantity influenced by the delay error.

7. The frequency selective system of claim 6, further comprising:
a fifth coupler having an input, a first output and a second output;
a bandpass filter; and
a power meter,
wherein:
the sensor is a power meter having an input and an output connected to the processing circuit;
the input of the fifth coupler is connected to the output of the second coupler; and
the second output of the fifth coupler is connected through the bandpass filter to the power meter.

8. The frequency selective system of claim 7, wherein the processing circuit is configured:
to dither the electronically controllable delay,
to detect synchronous changes in a signal at the output of the power meter, and
to estimate, from the synchronous changes in the signal at the output of the power meter, a magnitude and direction of the delay error.

9. The frequency selective system of claim 6, wherein the sensor is a digital to analog converter, and the processing circuit is configured to employ a least mean squares algorithm to adjust the electronically controllable delay.

10. The frequency selective system of claim 1, further comprising a polarization transducer in the first path.

11. The frequency selective system of claim 10, wherein:
the polarization transducer is an electronically controllable polarization transducer; and
the feedback control system is further configured to estimate a polarization error and to feed back to the electronically controllable polarization transducer to reduce the polarization error, the polarization error being the difference between a present polarization in the first path, and a polarization for which:
a contribution, at a first frequency in the first frequency band, from the first path, to a signal at the output of the second coupler, has the same polarization as a contribution at the first frequency, from the second path, to the signal at the output of the second coupler.

12. The frequency selective system of claim 11, further comprising:
a fifth coupler having an input, a first output and a second output;
a bandpass filter; and
a power meter,
wherein:
the input of the fifth coupler is connected to the output of the second coupler; and
the second output of the fifth coupler is connected through the bandpass filter to the power meter,
wherein the feedback control system comprises a processing circuit configured to:
dither two or more control parameters of the electronically controllable polarization transducer,
detect synchronous changes in a signal at the output of the power meter, and
estimate, from the synchronous changes in the signal at the output of the power meter, a magnitude and direction of the polarization error.

13. The frequency selective system of claim 12, wherein the processing circuit is configured to dither the two or more control parameters at different respective frequencies.

14. The frequency selective system of claim 1, further comprising a variable gain amplifier in the first path.

15. The frequency selective system of claim 14, wherein:
the variable gain amplifier is an amplifier having an electronically controllable gain; and
the feedback control system is further configured to estimate a gain error and to feed back to the electronically controllable gain to reduce the gain error, the gain error being the difference between a present gain in the first path, and a gain for which:
a contribution, at a first frequency in the first frequency band, from the first path, to a signal at the output of the second coupler, has the same amplitude as a contribution at the first frequency, from the second path, to the signal at the output of the second coupler.

16. The frequency selective system of claim 15, further comprising:
a fifth coupler having an input, a first output and a second output;
a bandpass filter; and
a power meter,
wherein:
the input of the fifth coupler is connected to the output of the second coupler; and
the second output of the fifth coupler is connected through the bandpass filter to the power meter,
wherein the feedback control system comprises a processing circuit configured to:
dither the electronically controllable gain,
detect synchronous changes in a signal at the output of the power meter, and
estimate, from the synchronous changes in the signal at the output of the power meter, a magnitude and direction of the gain error.

17. The frequency selective system of claim 1, further comprising:
a first bandpass filter having a pass band extending over the first frequency band;
an amplifier connected to an output of the first bandpass filter; and
a second bandpass filter, having a pass band extending over the first frequency band, connected to an output of the amplifier.

18. A frequency selective system having a first input for receiving an input signal including a plurality of frequency bands and a first output, the frequency selective system comprising:
- a first coupler for splitting the input signal to a first path and a second path each having an input and an output;
- a second coupler, having a first input connected to the output of the first path and a second input connected to the output of the second path, for combining the output of the first path and the output of the second path,
- the first coupler, the first path, the second path, and the second coupler being configured to produce at least partial cancellation, at the output of the second coupler, of signal components, in the input signal, within a first frequency band of the plurality of frequency bands, wherein:
- the first path further comprises a variable delay element;
- the variable delay element has an electronically controllable delay; and
- the frequency selective system further comprises a control system configured to estimate a delay error and to feed back to the electronically controllable delay to reduce the delay error, the delay error being the difference between a present delay in the first path, and a delay at which:
  - a contribution at a first frequency in the first frequency band, from the first path, to a signal at the output of the second coupler, has a phase differing by 180 degrees from the phase of a contribution at the first frequency, from the second path, to the signal at the output of the second coupler,
- the control system being configured to estimate the delay error utilizing a least mean squares algorithm.

* * * * *